United States Patent [19]

Ruderer et al.

[11] Patent Number: 5,153,150

[45] Date of Patent: Oct. 6, 1992

[54] PARTIALLY CRYSTALLIZING ENAMEL CONTAINING $Zn_2SiO_4$ TO BE USED FOR AUTOMOBILE SIDE AND REAR LIGHTS

[75] Inventors: Clifford G. Ruderer, Pittsburgh, Pa.; Gordon J. Roberts, Parma, Ohio; Robert C. Stroup, Pittsburgh, Pa.

[73] Assignee: Ferro Corporation, Cleveland, Ohio

[21] Appl. No.: 579,301

[22] Filed: Sep. 7, 1990

[51] Int. Cl.[5] .................. C03C 8/04; C03C 8/14; C03C 8/66

[52] U.S. Cl. ........................... 501/17; 501/26; 501/79; 501/73

[58] Field of Search .............. 501/17, 26, 79, 73

[56] References Cited

U.S. PATENT DOCUMENTS

| | | | |
|---|---|---|---|
| 2,920,971 | 1/1960 | Stookey | 501/2 |
| 3,113,878 | 12/1963 | Martin | 501/79 X |
| 4,196,004 | 4/1980 | Berretz | 54/18 |
| 4,224,627 | 9/1980 | Powell et al. | 346/75 |
| 4,282,026 | 8/1981 | McMaster et al. | 65/273 |
| 4,310,357 | 1/1982 | Matsuura et al. | 501/15 |
| 4,365,021 | 12/1982 | Pirooz | 501/15 |
| 4,522,925 | 6/1985 | Pirooz | 501/15 |
| 4,596,590 | 6/1986 | Boaz | 65/60.51 |
| 4,684,389 | 8/1987 | Boaz | 65/24 |
| 4,837,383 | 6/1989 | Andrews | 427/108 |
| 4,882,301 | 11/1989 | Gettys et al. | 501/17 |
| 4,975,301 | 12/1990 | Andrews et al. | 427/126.2 |
| 4,983,196 | 1/1991 | Stotka | 65/24 |
| 5,001,087 | 3/1991 | Kubota et al. | 501/26 X |

FOREIGN PATENT DOCUMENTS

| | | |
|---|---|---|
| 577383 | 6/1959 | Canada . |
| 0370683 | 5/1990 | European Pat. Off. . |
| 5420018 | 7/1977 | Japan . |
| 2102147 | 7/1988 | Japan . |
| 1212249 | 8/1989 | Japan . |
| 2133336 | 5/1990 | Japan . |

OTHER PUBLICATIONS

Hawley's Condensed Chemical Dictionary, 1987, pp. 1031 and 842.

*Introduction to Ceramics*, W. D. Kingery, copyright 1960, pp. 305-309.

Primary Examiner—Mark L. Bell
Assistant Examiner—Lisa M. Schull
Attorney, Agent, or Firm—Renner, Otto, Boisselle & Sklar

[57] ABSTRACT

The present invention provides a new and useful composition and method of using the same for producing an enamel finish on a formed section of glass. The composition partially crystallizes upon heating, thereby helping to prevent the forming and handling equipment from sticking and/or adhering to the composition during the forming operation. The composition includes a crystallizable glass frit and seed powder. The crystallized glass frit includes precursors from which $Zn_2SiO_4$ can be crystallized upon firing of the composition. The seed powder causes at least a portion of the precursors to crystallize upon firing such that during firing at least a portion of the crystallizable glass frit yields crystallized $Zn_2SiO_4$ formed by the precursors. Preferably, the precursors contain 30-75 wt %/5-20 wt % $SiO_2$, and the seed powder contains crystalline $Zn_2SiO_4$.

21 Claims, No Drawings

PARTIALLY CRYSTALLIZING ENAMEL CONTAINING $Zn_2SiO_4$ TO BE USED FOR AUTOMOBILE SIDE AND REAR LIGHTS

TECHNICAL FIELD

The present invention concerns a composition for use in producing an enamel and a method of using the same. More particularly, the invention concerns a composition for use in producing an enamel finish on a formed section of glass wherein the composition partially crystallizes upon heating of the section of glass thereby facilitating the forming operation.

BACKGROUND

As set forth in Gettys et al. U.S. Pat. No. 4,882,301, glass sections for automobiles, trucks or other automotive conveyance devices, including, for example, side and rear lights or windows, and windshields, are many times produced with varying degrees of curvature as opposed to flat, planar surfaces. If a curvature is desired in a given section, it is heated to a temperature in the vicinity of about 1300° F., at which point it is ready to be subjected to a bending or curving stress employing any number of suitable molding or pressing techniques. The section of glass, during the bending operation, maintains sufficient surface hardness such that the press head of the equipment employed to bend or curve the glass or the vacuum head utilized to pick up and transport the section of glass does not disturb the surface of the glass with which it contacts.

Automotive manufacturers have found that the appearance of a section of glass is greatly enhanced by applying a relatively narrow, opaque, colored band or border around the edge of the section of glass, along the inner surface. This band, which frames the edge of the inner surface of the section of glass, may vary anywhere from about an inch to about six inches in width. By blocking the passage of sunlight this band also serves to prevent the degradation of underlying adhesives by U.V. radiation.

Because of its relative durability, it has been found that the colored band is best produced through the use of a composition that forms an enamel during the heating and forming of the section of glass. As discussed in U.S. Patent No. 4,882,301, preferably the composition which is utilized to form the enamel is such that it prevents the press or vacuum head of the equipment utilized to bend or transport the section of glass from sticking to the enamel and/or disturbing the surface of the enamel.

As set forth in U.S. Patent No. 4,882,301 there are essentially two ways to help prevent the press or vacuum head from sticking to the glass enamel. More particularly, either a large amount of precursors of $Zn_2SiO_4$ or $Cd_2SiO_4$ may be incorporated into the composition utilized to produce the enamel (i.e., large amounts of ZnO, $SiO_2$ or CdO may be included in the composition), or a significant amount of crystalline $Zn_2SiO_4$ or $Cd_2SiO_4$ may be utilized in the composition (i.e., from about 25 percent by weight to about 50 percent by weight $Cd_2SiO_4$ or $Zn_2SiO_4$ may be included in the composition). Successful results have been obtained when using CdO as a precursor as disclosed in U.S. Pat. No. 4,882,301. However, in light of recent environmental restrictions and concerns, cadmium is sometimes not preferred for use in industry. Unfortunately, when zinc is substituted for the cadmium, the results have been less than desirable. Specifically, when either significant amounts of the precursors of $Zn_2SiO_4$ or crystalline $Zn_2SiO_4$ itself have been substituted for the cadmium, the melting temperature of the composition has been adversely affected and/or the vacuum or press head has stuck to and/or visually impaired the surface of the enamel.

SUMMARY OF THE INVENTION

The present invention provides a new and useful composition for producing an enamel layer or finish which affords various distinct advantages over the prior art enamel forming compositions. More particularly, the present invention provides a new and useful cadmium-free composition for forming an enamel finish on the surface of a formed section of glass which facilitates the forming of the glass. Specifically, the composition serves to prevent the glass forming and handling equipment from sticking to the composition while the section of glass and the composition are being simultaneously fired and formed. Similarly, the composition serves to prevent the glass forming and handling equipment from disturbing the surface of the enamel finish formed by the composition.

In a preferred embodiment the composition comprises a crystallizable glass frit including precursors from which $Zn_2SiO_4$ can be crystallized upon firing of the composition at temperatures at which glass sections are generally formed. The precursors comprise from about 35 percent by weight to about 100 percent by weight of the crystallizable glass frit. More particularly, at least 30 percent by weight of the precursors comprise ZnO and at least 5 percent by weight of the precursors comprise $SiO_2$. The composition also includes a seed powder which causes at least a portion of the precursors to crystallize during firing such that subsequent to firing at least about 2 percent by weight of the crystallizable glass frit yields crystallized $Zn_2SiO_4$ formed by the precursors. The seed powder preferably comprises crystalline $Zn_2SiO_4$.

The foregoing and other features of the invention are hereinafter more fully described and particularly pointed out in the claims. The following description setting forth in detail certain illustrative embodiments of the invention, these being indicative, however, of but a few of the various ways in which the principles of the invention may be employed.

DETAILED DESCRIPTION

A composition made in accordance with the principles of the present invention, for use in producing a layer of enamel or an enamel finish or band upon a section of glass at typical glass forming temperatures, comprises a crystallizable glass frit and a seed powder. The crystallizable glass frit includes precursors from which $Zn_2SiO_4$ can be crystallized upon heating or firing of the composition. The seed powder causes at least a portion of the precursors to crystallize upon firing such that subsequent to firing at least about 2 percent by weight of the crystallizable glass frit yields crystallized $Zn_2SiO_4$ formed by the precursors.

The precursors include ZnO and $Si_2$. The ZnO comprises from about 30 percent by weight to about 75 percent by weight of the crystallizable glass frit. Preferably, the ZnO comprises from about 40 percent by weight to about 70 percent by weight of the crystallizable glass frit. More preferably, the ZnO comprises from about 50 percent by weight to about 65 percent by weight of the crystallizable glass frit. The $Si_2$ comprises from about 5 percent by weight to about 20 percent by weight of the crystallizable glass frit. Preferably, the $Si_2$ comprises from about 5 percent by weight to about 15 percent by weight of the crystallizable glass frit. More preferably, the $Si_2$ comprises from about 10 percent by weight to about 15 percent by weight of the crystallizable glass frit.

It will be appreciated that all references made herein this specification and the claims below to precursors such as "ZnO", "$Si_2$" and "CdO", or any other components of a glass frit, do not imply any molecular structure or order to the atoms that comprise the precursors or components, unless otherwise indicated. Thus, the references made herein to, for example, "ZnO" instead of "Zn" and "O", are merely an attempt to conform to conventional practices commonly employed by persons in the glass or frit industries when referring to the chemical composition or makeup of a glass.

The seed powder comprises a crystalline material which causes the precursors to form crystalline $Zn_2SiO_4$ upon firing of the composition at glass forming temperatures and times normally employed in the art. Preferably, the seed powder comprises crystalline $Zn_2SiO_4$. Preferably, the crystalline $Zn_2SiO_4$ comprises at least about 50 percent by weight of the seed powder. More preferably, the crystalline $Zn_2SiO_4$ comprises at least about 90 percent by weight of the seed powder.

In addition to the seed powder and a crystallizable frit, the composition may also include one or more pigments, one or more noncrystallizable glass frits, one or more fillers and a suitable vehicle which allows the composition to take the form appropriate for application of the composition to a section of glass such as, for example, a slurry, a paste or a thermoplastic pellet.

The crystallizable glass frit comprises at least about 5 percent by weight of the resultant enamel finish or composition subsequent to firing. Preferably, the crystallizable glass frit comprises at least about 10 percent by weight of the resultant enamel finish or composition subsequent to firing. More preferably, the crystallizable glass frit comprises at least about 20 percent by weight of the resultant enamel finish or composition subsequent to firing.

The seed powder is present in the composition in an amount comprising at least about 1 percent by weight of the crystallizable glass frit. Preferably, the seed powder is present in the composition in an amount comprising from about 5 percent by weight to about 50 percent by weight of the crystallizable glass frit. More preferably, the seed powder is present in the composition in an amount comprising from about 10 percent by weight to about 40 percent by weight of the crystallizable glass frit.

The seed powder includes a particle size of less than about 40 microns. Preferably, the average particle size of the seed powder is less than about 10 microns. More preferably, the average particle size of the seed powder is less than about 5 microns.

The composition is utilized in the production of a section of formed decorated glass by first mixing the crystallizable glass frit, the seed powder, and one or more fillers, vehicles, noncrystallizable glass frits and pigments if so desired, so as to produce a form appropriate for application of the composition to a section of glass. Subsequent to the application of the composition the section of glass is then heated to a temperature of from about 900° F. to about 1400° F. and then formed to a desired shape. Generally, the step of heating and forming the section of glass is carried out simultaneously or at substantially the same time. Such forming may be carried out utilizing a press device which may include a head covered with a material such as FIBERFRAX refractory fiber. FIBERFRAX is a registered trademark for refractory fiber owned by the Stemcor Corporation of Cleveland, Ohio. During the forming operation the refractory fiber contacts the layer of composition and the applicants believe that the crystallization of $Zn_2SiO_4$ that occurs during heating helps to prevent the refractory fiber from sticking to the composition and/or causing the surface of the resultant enamel finish produced by the composition from becoming disrupted or disturbed. Similarly, generally the vacuum head utilized to transport the glass is covered with a refractory fiber such as FIBERFRAX refractory fiber and applicants believe that the crystallization that occurs during heating helps to prevent the refractory fiber from sticking to the composition and/or causing the surface of the resultant enamel finish from becoming disrupted or disturbed.

An example of a composition which may be successfully utilized to produce a section of decorated formed glass is as follows:

| Components | Percent by Weight |
| --- | --- |
| Crystallizable glass frit | 20.8 |
| Conventional glass frit | 40.0 |
| Seed powder | 3.2 |
| Pigment | 16.0 |
| Vehicle | 20.0 |

In the above example the seed powder comprises about 100 percent by weight crystalline $Zn_2SiO_4$. The crystallizable glass frit comprises about 63.2 percent by weight ZnO, about 24.5 percent by weight $B_2O_3$ and about 12.3 percent by weight $SiO_2$. Pigments may include, for example, copper chromite black, titanium dioxide white, cobalt aluminate blue, zinc iron chromite brown or other suitable pigments required to produce the desired color. The seed powder has an average particle size of about 1.6 microns.

The conventional glass frit may comprise any one of a variety of conventional glass frits or mixtures thereof. Generally, the specific glass frit utilized is selected on the basis of various parameters associated with a particular application. More particularly, the specific conventional glass frit employed is generally selected on a basis of, for example, firing temperatures and times, the dimensions of the section of glass being formed, the degree of and time required for forming, and the type of enamel finish required.

Although the invention has been shown and described with respect to certain preferred embodiments, it is obvious that equivalent alterations and modifications will occur to others skilled in the art upon their reading and understanding of the specification. The present invention includes all such equivalent alterations and modifications, and is limited only by the scope of the following claims.

What is claimed is:

1. A composition which during firing forms an enamel, said composition comprising:

A. a crystallizable glass frit including precursors from which $Zn_2SiO_4$ can be crystallized upon firing of said composition, said crystallizable glass frit comprising from about 30 percent by weight to about 75 percent by weight ZnO and from about 5 percent by weight to about 20 percent by weight $SiO_2$; and B. a separate and distinct quantity of seed powder, wherein said seed powder comprises $Zn_2SiO_4$ and causes at least a portion of said precursors to crystallize upon firing such that during firing at least a portion of said crystallizable glass frit yields crystallized $Zn_2SiO_4$ formed by said precursors, said seed powder comprising up to about 50 percent by weight of said crystallizable glass frit.

2. A composition as set forth in claim 1 wherein said ZnO is present in an amount comprising from about 40 percent by weight to about 70 percent by weight of said crystallizable glass frit.

3. A composition as set forth in claim 1 wherein said ZnO is present in an amount comprising from about 50 percent by weight to about 65 percent by weight of said crystallizable glass frit.

4. A composition as set forth in claim 1 wherein said $SiO_2$ is present in an amount comprising from about 5 percent by weight to about 15 percent by weight of said crystallizable glass frit.

5. A composition as set forth in claim 1 wherein said $SiO_2$ is present in an amount comprising from about 10 percent by weight to about 15 percent by weight of said crystallizable glass frit.

6. A composition as set forth in claim 1 wherein said seed powder is present in said composition in an amount comprising at least about 1 percent by weight of said crystallizable glass frit.

7. A composition as set forth in claim 1 wherein said seed powder is present in said composition in an amount comprising from about 5 percent to about 50 percent by weight of said crystallizable glass frit.

8. A composition as set forth in claim 1 wherein said seed powder is present in said composition in an amount comprising from about 10 to about 40 percent by weight of said crystallizable glass frit.

9. A composition as set forth in claim 1 wherein the average particle size of said seed powder is less than about 40 microns.

10. A composition as set forth in claim 1 wherein the average particle size of said seed powder is less than about 10 microns.

11. A composition as set forth in claim 1 wherein said seed powder comprises at least about 50 percent by weight crystallized $Zn_2SiO_4$.

12. A composition as set forth in claim 1 wherein said seed powder comprises at least about 90 percent by weight crystallized $Zn_2SiO_4$.

13. A composition as set forth in claim 1 including at least one pigment.

14. A composition as set forth in claim 1 including at least one filler.

15. A composition as set forth in claim 1 including at least one vehicle.

16. A composition as set forth in claim 1 including at least one noncrystallizable glass frit.

17. A composition as set forth in claim 8 wherein said crystallizable glass frit comprises at least about 5 percent by weight of said composition subsequent to firing.

18. A composition as set forth in claim 8 wherein said crystallizable glass frit comprises at least about 10 percent by weight of said composition subsequent to firing.

19. A composition as set forth in claim 8 wherein said crystallizable glass frit comprises at least about 20 percent by weight of said composition subsequent to firing.

20. A composition which upon firing forms a glass enamel, said composition comprising:
A. a crystallizable glass frit including precursors from which $Zn_2SiO_4$ can be crystallized upon firing of said composition, said precursors comprising from about 35 percent by weight to about 100 percent by weight of said crystallizable glass frit with from about 30 percent by weight to about 75 percent by weight of said precursors comprising ZnO and from about 5 percent by weight to about 20 percent by weight of said precursors comprising $SiO_2$; and
B. a separate and distinct quantity of seed powder, said seed powder causing at least a portion of said precursors to crystallize upon firing such that during firing at least about 2 percent by weight of said crystallizable glass frit yields crystallized $Zn_2SiO_4$ formed by said precursors, said seed powder consisting essentially of crystalline $Zn_2SiO_4$, said seed powder comprising up to about 50 percent by weight of said crystallizable glass frit.

21. A composite for use in producing an enameled section of glass upon firing, said composite comprising:
A. a layer of vitrified glass; and
B. a layer of a composition for forming an enamel coating on said layer of vitrified glass upon firing, said composition comprising:
i. a crystallizable glass frit including precursors from which $Zn_2SiO_4$ can be crystallized during firing, said glass frit comprising from about 30 percent by weight to about 75 percent by weight ZnO and from about 5 percent by weight to about 20 percent by weight $SiO_2$; and
ii. a separate and distinct quantity of seed powder, wherein said seed powder comprises $Zn_2SiO_4$ and causes at least a portion of said precursors to crystallize upon firing such that during firing at least a portion of said crystallizable glass frit yields crystallized $Zn_2SiO_4$ formed by said precursors, said seed powder comprising up to about 50 percent by weight of said crystallizable glass frit.

* * * * *